LIQUID-METAL VALVE WITH RUPTURABLE DIAPHRAGM

Original Filed Feb. 14, 1962 3 Sheets-Sheet 1

INVENTOR
EDWARD B. SEVETZ
BY M. B. Tasker
ATTORNEY

INVENTOR
EDWARD B. SEVETZ
BY M. B. Tasker
ATTORNEY

INVENTOR
EDWARD B. SEVETZ
BY M. B. Tasker
ATTORNEY

United States Patent Office 3,176,702

Patented Apr. 6, 1965

3,176,702

LIQUID-METAL VALVE WITH RUPTURABLE DIAPHRAGM

Edward B. Sevetz, West Hartford, Conn., assignor to United Aircraft Corporation, East Hartford, Conn., a corporation of Delaware Original application Feb. 14, 1962, Ser. No. 173,227, now Patent No. 3,148,859. Divided and this application Aug. 28, 1963, Ser. No. 308,613

3 Claims. (Cl. 137—68)

This is a divisional application of application Serial No. 173,227, filed February 14, 1962, now Patent No. 3,148,859, entitled Liquid-Metal Valve by Edward B. Sevetz.

It has been proposed to provide a valve which is positively sealed in its closed position by a metal diaphragm. The diaphragm is removed by the first opening movement of the movable valve member. These valves have been single operation valves and have the disadvantage that the diaphragm is left free in the system once the valve has been opened.

It is an object of this invention to provide a valve of this type in which the diaphragm, when severed from sealing relation, remains fixed to the movable valve member, and the valve is capable of being closed and opened repeatedly following the severing of the positive diaphragm seal.

A further object of the invention is generally to improve the construction and operation of high-temperature liquid-metal valves.

These and other objects and advantages of the invention will be obvious or will be pointed out in connection with the following detailed description of a preferred embodiment of the invention shown in the accompanying drawings.

Figure 1:
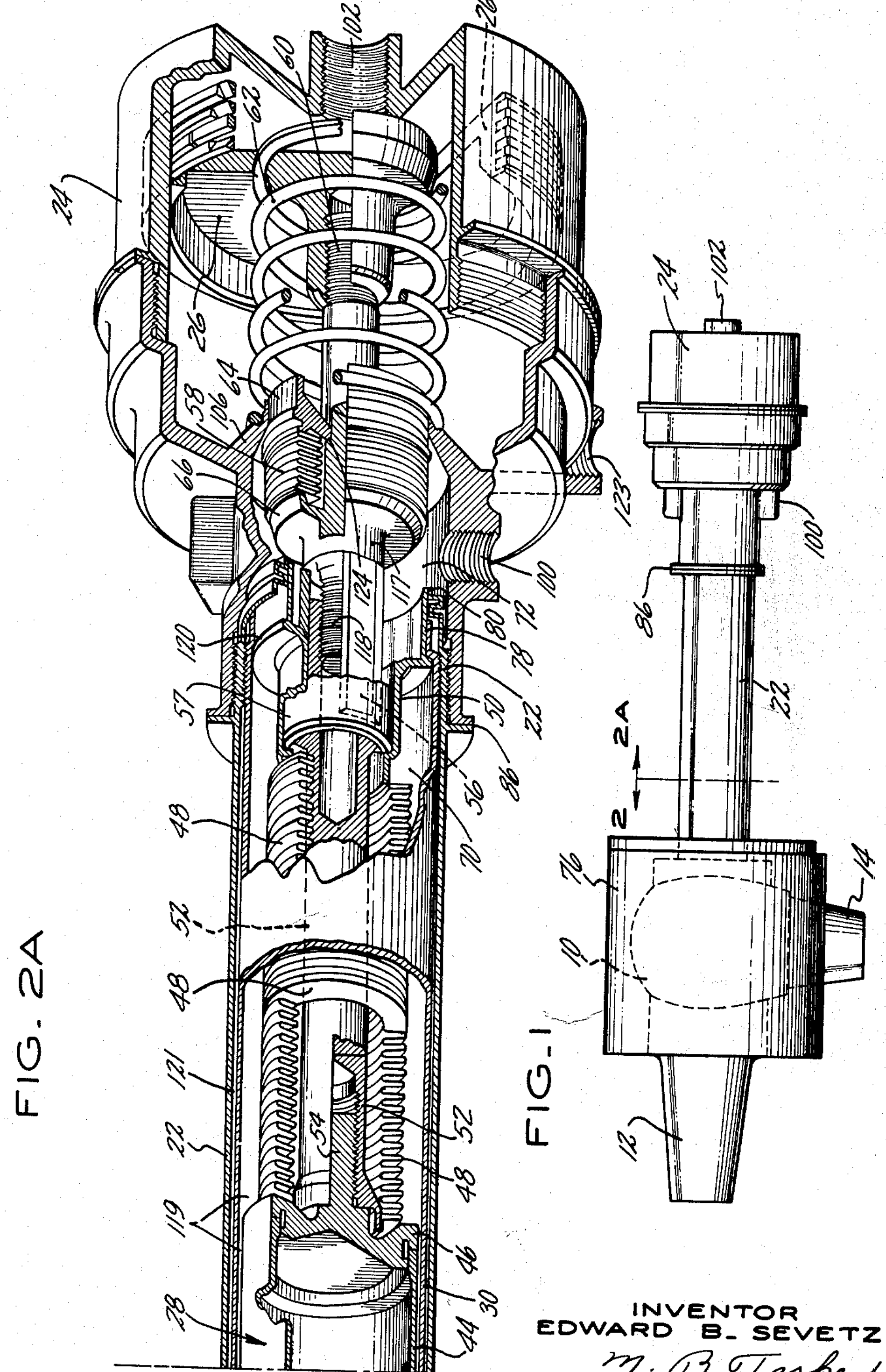
Figure 2:
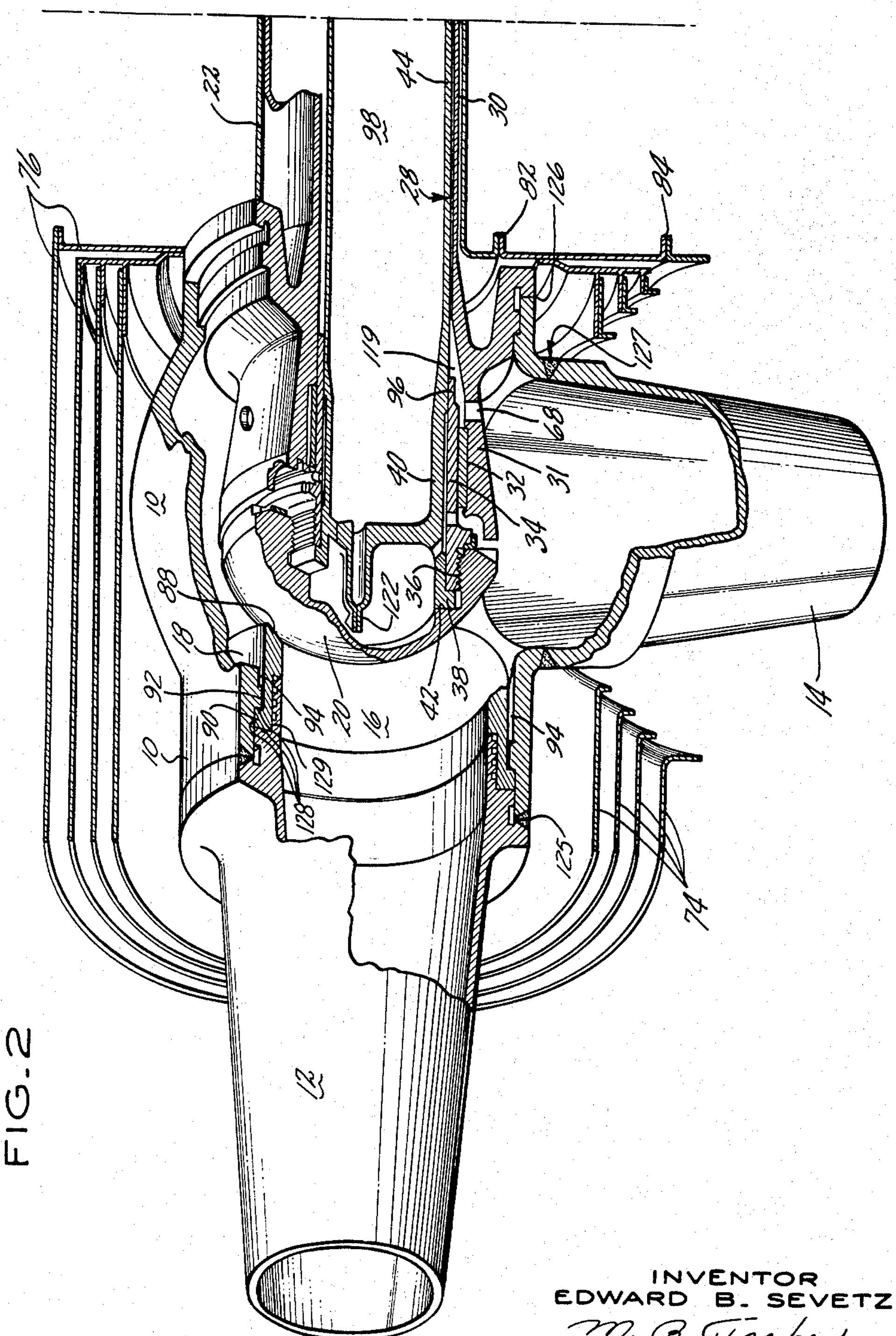
Figure 3:
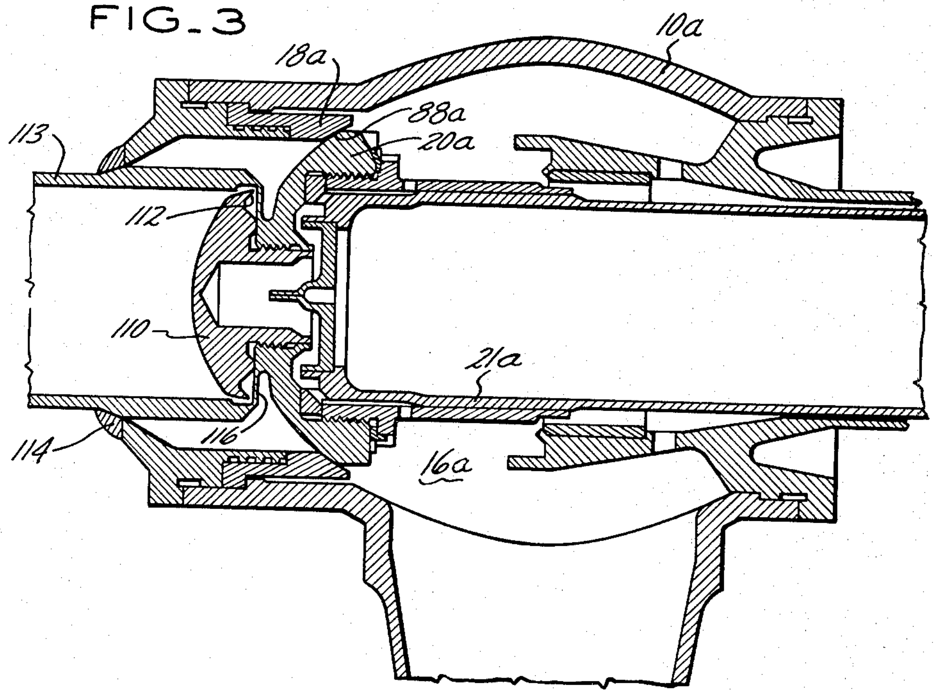
Figure 4:
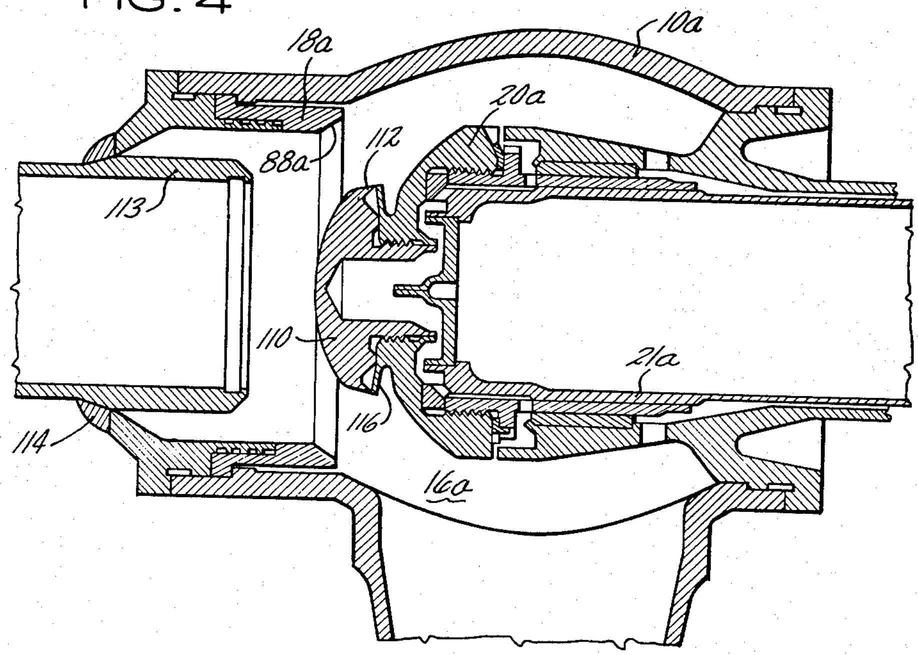

In these drawings:

FIG. 1 is a side elevation of the liquid-metal valve of this invention;

FIGS. 2 and 2*a* are sectional elevations, in perspective, of divided parts of this valve, with the dividing line being indicated by 2–2*a* in FIG. 1;

FIG. 3 is a detail view showing the construction of the valve in the vicinity of the movable and stationary valve members, illustrating particularly the sealing diaphragm and the preferred diaphragm severing means, the valve being shown in the closed position; and FIG. 4 is a similar view showing the valve in its open position.

As shown herein, the liquid-metal valve of this invention is adapted for horizontal mounting, although it may be installed in a vertical position with the valve stem up. The valve consists of a valve body 10 having an inlet port 12 and an outlet port 14. The valve body defines a valve chamber 16 in which the annular stationary valve member 18 and the movable plug member 20 are located.

The valve body carries an outer elongated tubular casing 22 which supports at its free end a cylinder 24 for a valve-operating piston 26. The movable valve member, or plug, 20 is mounted at one end of a reciprocable valve stem assembly 28 which is operatively connected to said valve plug 20 at said one end and to said piston at its other end. An intermediate tubular sleeve 30, which is spaced from the valve stem assembly and from the outer casing 22, is connected to said valve body 10 at one end and to cylinder 24 at its other end, and is provided with an annular thickened extension 31 at its left-hand end (FIG. 2) which projects into the valve chamber 16. The valve back seat 124 on abutment 64 engages the movable valve stem member 117 and limits the valve in its opening movement. Extension 31 carries a journal 32 in which a bearing 34 of the valve stem assembly is slidable, bearing 34 being threaded at its forward end at 36 into an internal recess in plug 20. The forward end of bearing 34 engages a flange 38 of a tube 40, the forward end of which engages an abutment 42 on the plug 20. Tube 40, where it is attached to the plug, is of substantial wall thickness, but outside the valve body it tapers to a very thin-walled section 44 which extends outwardly of the valve body within casing 30 to a point midway of housing 22. At this point tube 44 is closed by a solid closure member 46. One end of a sealing bellows 48 is secured in a fluid-tight manner to the front end of stem 52. The other end of bellows 48 is secured in a fluid-tight manner to a shell 50 which is likewise mounted in a fluid-tight manner by a weld 78 on the inner end of tubular member 30 and by a weld 80 on outer casing member 22. Members 22 and 30 and shell 50 are secured at this point to the front portion of cylinder 24. The valve-operating stem 52 is screw-threaded at the front end onto a stem 54 of member 46 and extends rearwardly through a journal 57 carried by shell 50 and at its rear end stem 52 is screw-threaded onto a stem 117 of a threaded portion 118. Stem 117 extends rearwardly through a second sealing bellows 58 and terminates at its free end in a threaded portion 60 which is threaded into piston 26. Bearing 56 has four axial flutes which engage journal 57. A spring 62 bears against piston 26 and against an annular abutment 106 carried by cylinder 24. One end of bellows 58 is secured to abutment 64, its other end being connected to an outstanding flange 66 on the stem 117.

The liquid metal in chamber 16 communicates through holes 68 with the space 119 between the thin-walled tube 44 and intermediate tube 30 and surrounds bellows 48 and fills chamber 70 between the bellows and flange 120. A high-pressure gas introduced at port 100 is provided in chamber 72, which also occupies the interior of bellows 48 for the purpose of balancing the pressure of the liquid metal surrounding the bellows. A low-pressure gas is also provided in the space 121 between casing 22 and tube 30. This gas also fills the spaces between heat baffles 74 which surround the valve body and control the escape of heat from the valve body. The inert gas between the baffles is contained by jackets 76 and prevents corrosion of the valve body at high temperatures. The jackets are seal-welded at joints 78, 80, 82, 84 and 86. It will be understood that these jackets extend about inlet 12 and outlet 14 and are seal-welded thereto, these parts having been broken away in the drawing.

Referring more in detail to certain of these assemblies, it will be noted that the stationary annular valve seat 18 is a tubular member having an annular spherical-surfaced seat 88 at its right-hand end and having an outstanding annular flange 90 at its other end which engages flange abutments on valve body 10. It will also be noted that the sleeve 18 is spaced from the valve body about its entire periphery back to a flange 92 on the valve body, providing ample clearance 94 about member 18 to which the liquid metal in the valve body has access. As a result, the problem of valve-body distortion at high temperatures is eliminated.

In order to insure that the valve plug 20 is accurately aligned with the annular spherical-surfaced seat 88 when the valve is closed, the sliding bearing 34 is provided with a reduced portion 96 which moves over the left-hand end of journal 32 in the final closing movement of the valve. Accordingly, the valve stem assembly has a normal sliding fit in its guide bearings during valve movement, except when in the axial travel of the valve stem assembly, just before the valve plug contacts the valve seat, the clearance between the bearing 34 and the journal 32 is increased, permitting the valve plug to locate itself in the valve seat without interference and without galling of the guide bearings.

In order to minimize the heat transfer from the liquid metal in the valve body 10 in the direction of the sealing and operating mechanism of the valve, the tube 28, which is preferably made of columbium, is made with a very thin wall and the cavity 98 within this tube is filled with tantalum wool which has a very low heat conductivity. This chamber is also filled with an inert gas which is low in heat conductivity and is then sealed leak-tight by welding nipple 122. The metal wool prevents transfer of heat axially along the shaft by convection of the gas.

The valve is pneumatically operated through piston 26 and, therefore, is suited for remote control operation. Gas is introduced at 123, which acts on one side of the piston to open the valve, and at 102 to act on the opposite side of the piston to close the valve. Compression spring 62, which has one end seated on the left-hand face of the piston 26 (FIG. 2A) and its other end bearing against an internal flange 106 on cylinder 24, thus serves to return the valve to open position in the event that pressure of the valve-actuating gas fails. Liquid metal in chamber 119 is prevented from entering chamber 72 by welds 78 and 80. Liquid metal is prevented from entering chamber 72 along the shaft by bellows 48. In the event of liquid metal reaching chamber 72, it is prevented from entering the actuating gas chamber by bellows 58 and backstop seat 124.

The axial shaft, or stem 52, is supported by the two axially spaced bearings 34 and 56, each of which has axial flutes to reduce the bearing area, since surfaces of this sort are susceptible to self-welding at the high temperatures prevailing in liquid-metal valves. It will be noted that the bearing at 34 runs in liquid metal, whereas the bearing at 56 runs in a gas atmosphere.

All the parts of the valves which are exposed to liquid metal are of columbium or other material compatible with the liquid metal used, except for the stationary valve seat 18, plug member 20, and bearing and journal members 34, 32 which are made of suitable bearing materials.

In FIGS. 3 and 4 I have shown the liquid-metal valve including stationary and movable valve members which have a permanent seal formed integral therewith, thus insuring zero leakage until the seal is intentionally ruptured by the initial opening of the valve. Thereafter, the valve controls the flow of liquid metal by the cooperation of its stationary and movable valve members in the manner described above in FIG. 1.

In these figures, the valve body **10*a* encloses a chamber 16*a* in which a stationary valve member 18*a* is mounted. A movable contact 20*a* cooperates with the annular spherical-surfaced valve seat 88*a*, as described in connection with FIG. 2, being axially movable by a valve stem 21*a*. Plug 20*a* is made with an axial-threaded hole in which a thimble 110 is screwthreaded. Thimble 110 has a flanged annular rim terminating in a cutting edge 112 located in spaced relation in front of the plug member 20*a*. An inlet pipe 113 is provided, which is welded at 114 to valve body 10*a* and has its end terminated adjacent cutting edge 112. Pipe 113 and plug 20*a* are connected by a transverse web 116 which lies in position to be engaged and severed by the annular cutting edge 112 if the valve stem 21*a* is moved axially to the right in FIG. 3 in a valve-opening direction. The web 116 is shown herein as an integral part of plug 20*a* and pipe 113** which provides a sure seal against liquid-metal leakage.

In FIG. 4, the parts are shown in the position they occupy after the valve has been opened. It will be noted that the web 116 has been completely severed, but still remains attached to plug **20*a*, so there is no chance of its getting loose in the system. Also, it will be noted that the pipe 113** is freely open for liquid-metal flow and that the thimble and web do not prevent subsequent opening and closing of the valve.

It will be evident that as a result of this invention a particularly effective liquid-metal valve has been provided which is resistant to the corrosive action of liquid metals and effectively seals such metals against leakage.

It will also be evident that means has been provided in this valve to insure seating of the movable valve member without excessive force being required on the valve-operating stem. Also, provision has been made to provide a completely leak-proof valve during the period from the time the system is initially put in service until such time as the valve is intentionally opened and thereafter to provide for the control of the liquid-metal flow by virtue of improved cooperating stationary and movable contact members.

While a preferred embodiment of the invention has been illustrated and described, it will be evident that many variations may be made in the construction and arrangement of the parts within the scope of the appended claims.

I claim:

1. In a high-temperature liquid-metal valve, a valve body forming a valve chamber, a valve-operating stem extending into said chamber, a plug valve member mounted on said valve stem having an integral tubular member axially aligned with said stem, said tubular member being connected with said plug member by a thin-walled diaphragm which forms a closure for said tubular member, first and second ports in said valve body, said first port being axially aligned with said tubular member and in which said tubular member is fixed in a fluid-tight manner, a valve member fixed in said valve body having an annular seat axially aligned with said plug valve member and adapted to cooperate therewith to form a fluid-tight closure for said valve, and an annular cutting member located in said tubular member on the opposite side of said diaphragm from said plug member with its cutting edge adjacent said diaphragm, said cutting member having an operative connection with said valve stem, whereby upon initial opening movement of the latter said diaphragm will be severed by the cutting member and bodily removed to open said first port into said valve chamber establishing a flow path through said tubular member, chamber and second port.

2. In a high-temperature liquid-metal valve, a valve body defining a valve-operating chamber for cooperating stationary and movable valve members, a valve stem extended into said chamber, first and second ports formed in said valve body, one of which is in axial alignment with said stem, a plug valve member on the end of said stem in said chamber comprising said movable valve member, a cooperating valve member fixed to said valve body about said axial port including an annular seat adapted to cooperate with said plug valve member to form a fluid-tight closure for said valve, said first port having a sleeve therein supported by said valve body and connected in fluid-tight relationship thereto, means for connecting the adjacent ends of said sleeve and said plug valve in fluid-tight relationship including a thin web integral with said plug member and with said sleeve, and means carried by said plug member having a cutter located on the opposite side of said web from said plug member for severing and removing said web from said sleeve upon the first reciprocation of said stem in a valve-opening direction establishing a flow path through said sleeve, chamber and second port.

3. In a high-temperature liquid-metal valve, a valve body defining a valve-operating chamber for cooperating stationary and movable valve members, a valve stem extended into said chamber, first and second ports formed in said valve body, said first port being in axial alignment with said stem, a plug valve member on the end of said stem in said chamber comprising said movable valve member, a cooperating valve member fixed to said valve body about said first port including an annular seat adapted to cooperate with said plug valve member to form a fluid-tight closure for said valve, said first port having a sleeve therein supported by said valve body and connected in a fluid-tight relationship thereto, means for connecting the adjacent ends of said sleeve and said plug valve in fluid-tight relationship including a thin web integral with said plug member and with said sleeve, and cutter means carried by said plug member on the opposite side of said web from said plug member for severing the connection of said web with said sleeve upon the first valve opening movement of said stem while leaving said web attached to said plug establishing a flow path through said sleeve, chamber and second port.

References Cited by the Examiner

UNITED STATES PATENTS

| | | | |
|---|---|---|---|
| 1,665,391 | 4/28 | Willoughby | 137—69 |
| 2,405,439 | 8/46 | Lubbock | 137—68 |
| 2,426,808 | 9/47 | Auer | 137—68 XR |
| 2,932,308 | 4/60 | Erb | 137—70 |
| 2,947,315 | 8/60 | Connell | 137—68 |

FOREIGN PATENTS

| | | |
|---|---|---|
| 188,949 | 11/22 | Great Britain. |

ISADOR WEIL, *Primary Examiner.*